F. EGGE.
METHOD OF MAKING CABLE CHAINS.
APPLICATION FILED DEC. 23, 1909.

978,717.

Patented Dec. 13, 1910.

WITNESSES:

INVENTOR.
Frederick Egge.
BY
ATTORNEY.

UNITED STATES PATENT OFFICE.

FREDERICK EGGE, OF BRIDGEPORT, CONNECTICUT, ASSIGNOR TO THE SMITH & EGGE MANUFACTURING CO., OF BRIDGEPORT, CONNECTICUT, A CORPORATION OF CONNECTICUT.

METHOD OF MAKING CABLE-CHAINS.

978,717.  Specification of Letters Patent.  Patented Dec. 13, 1910.

Application filed December 23, 1909. Serial No. 534,669.

*To all whom it may concern:*

Be it known that I, FREDERICK EGGE, a citizen of the United States, residing at Bridgeport, in the county of Fairfield and State of Connecticut, have invented certain new and useful Improvements in Methods of Making Cable-Chains; and I do hereby declare the following to be a full, clear, and exact description of the invention, such as will enable others skilled in the art to which it appertains to make and use the same.

My invention relates to certain improvements in the method of making cable chains, and has for its object to increase the efficiency and strength of such chains and to reduce to a minimum the wearing points, and with these ends in view my invention consists in the novel steps and methods hereinafter fully described and then particularly pointed out in the claim which concludes this description.

Figure 1:
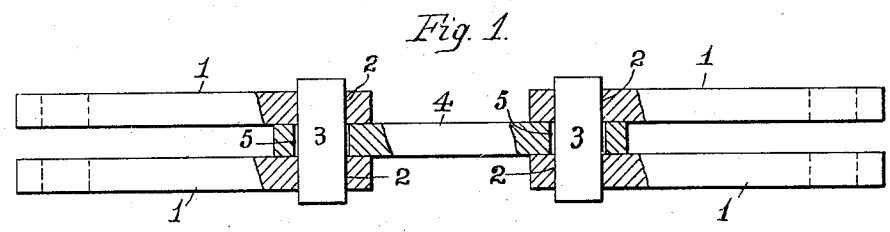
Figure 2:
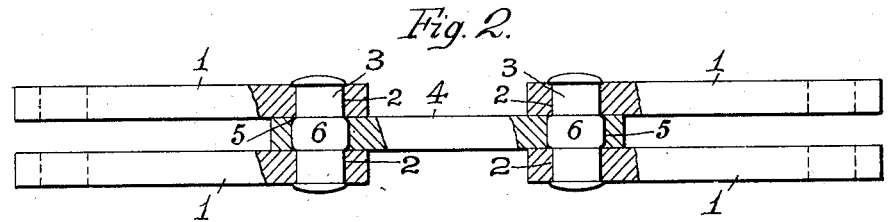
Figure 3:
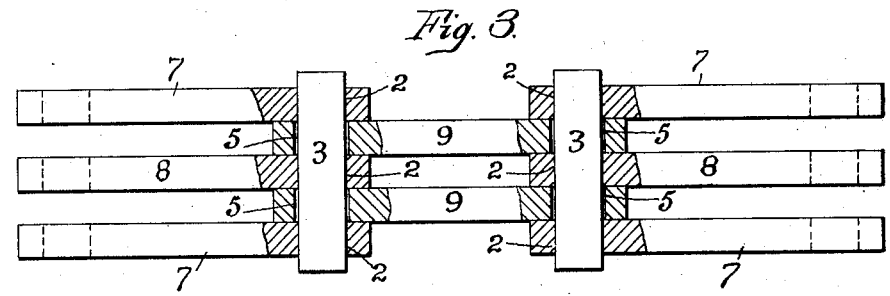
Figure 4:
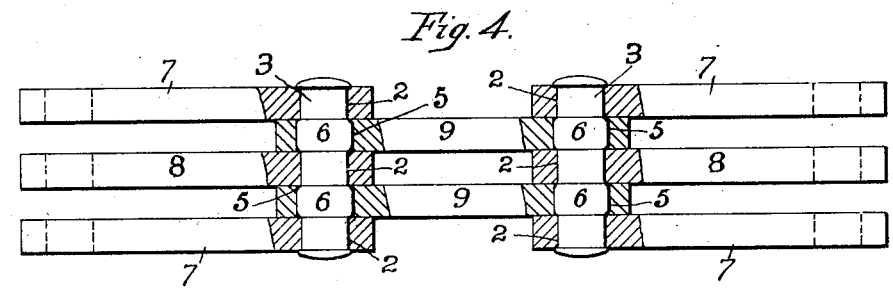

In the accompanying drawing Figure 1 is a sectional elevation showing the manner in which the parts of the chain are assembled prior to the final completion of the chain. Fig. 2 a sectional elevation of the completed chain, and Figs. 3 and 4 are sectional elevations similar to Figs. 1 and 2 except that in the latter the chain is shown as composed of three links while in these Figs. 3 and 4 such chain is composed of five links.

Similar numbers of reference denote like parts in the several figures of the drawing.

In the manufacture of cable chains as heretofore practiced, the links all have piercings of the same diameter, and such links are placed edgewise and a rivet inserted through the alined piercings, after which the rivet is headed at both ends. This leaves each link loose on the rivet and therefore when in use each link of a chain of this sort is constantly wearing against the rivet and it is one of the objects of my improvement to reduce this wearing to a minimum.

In carrying out my improvement I form the piercings in the links of different diameters, one set of piercings fitting the rivets snugly as the latter are inserted therethrough while the other set of piercings are of a diameter considerably greater than that of the rivet; I then upset the rivets, and this operation will cause the latter to bind rigidly within the smaller piercings while the body of the rivet will swell, owing to the upsetting operation, but will not bind within the large piercings owing to the diameter of the latter.

Referring to Figs. 1 and 2 of the drawings, the outer links 1 have piercings 2 which closely fit the rivet 3 when the latter is inserted therethrough and before the upsetting operation while the inner link 4 has its piercings 5 of greater diameter than that of the rivet, so that when the latter is upset it will bind rigidly within the piercings of the links 1 and will be swelled in the center as shown at 6 within the piercings 5 but will not bind against the latter, the consequence being that the only wearing points of the chain are where the inside link bears against the rivet pins. This upsetting of the rivet pins greatly strengthens the latter and also provides ball bearings formed by the swaging operation on the rivets at the points where said rivets pass through the links with the enlarged piercings.

Referring to Figs. 3 and 4 where the chain is shown composed of five links through which the rivets pass, I preferably make the small piercings within the outer links 7 and the middle links 8, while the enlarged piercings are formed within the alternate links 9 which are located between the middle link and the outer links. Of course, if desired, the outer links may be provided with the large piercings while the intermediate links may have the small piercings, but this is fully within my invention, the gist of which rests in the broad idea of providing some links with large piercings and the other links with small piercings, then alining these piercings and inserting therethrough the rivets and finally upsetting the latter so that they will bind within the small piercings and be loose within the large piercings.

Having thus described my invention what I claim as new and desire to secure by Letters Patent is:—

The method of making cable chains, which consists in providing the links some with small piercings and others with large piercings, inserting plain rivets within these piercings and finally upsetting the rivets and causing them to bind firmly within the small piercings and to be loose within the larger piercings.

In testimony whereof I affix my signature in presence of two witnesses.

FREDERICK EGGE.

Witnesses:
F. W. SMITH, Jr.,
M. T. LONGDEN.